United States Patent [19]

Giberson

[11] Patent Number: 5,207,903
[45] Date of Patent: May 4, 1993

[54] FILTER STAND ASSEMBLY

[76] Inventor: Melbourne F. Giberson, 5 Spring Mill La., Haverford, Pa. 19041

[21] Appl. No.: 962,287

[22] Filed: Oct. 16, 1992

[51] Int. Cl.$^5$ .................. B01D 35/00; B01D 35/16
[52] U.S. Cl. .................... 210/238; 210/248; 210/253; 210/323.2; 210/332
[58] Field of Search .......... 210/247, 248, 253, 323.2, 210/332, 464, 237, 238

[56] References Cited

U.S. PATENT DOCUMENTS 2,909,285 10/1959 Besler .................. 210/323.2
5,139,658 8/1992 Hodge .................. 210/248

Primary Examiner—Peter A. Hruskoci
Assistant Examiner—Robert James Popovics
Attorney, Agent, or Firm—Polster, Lieder, Woodruff & Lucchesi

[57] ABSTRACT

A modular filter drain assembly for a duplex filter having two upright filter canisters each containing a plurality of replaceable cylindrical filter elements includes a sump base pan, liquid impervious, with sides walls embracing the lower portion of the filter canisters and of the entire drain assembly; a stand outboard of each of the filter canisters, each of the stands having vertical legs at corners, a top drain pan near an upper end of the legs and supported thereby, a filter element support pan intermediate the top drain pan and the sump pan, and a platform extending between the stands. The top drain pan has filter element receiving passages near the platform and a drain passage. The filter element support pan has a surface below the filter element receiving passages for engaging a lower edge of the filter elements and a drain passage, the filter element support pan surface being spaced below the top pan a distance sufficiently less than the height of the filter elements to cause the elements to project above the top drain pan enough to permit the filter elements easily to be removed manually from the filter element passages.

6 Claims, 1 Drawing Sheet

FILTER STAND ASSEMBLY

BACKGROUND OF THE INVENTION

Duplex filters are commonly used in connection with the recycling of oil that is contaminated with water or other contaminants, in a continuous recycling such, for example as turbine oil, fluid drives for large pumps or fans, in connection with power plant operation, and the like. A duplex filter assembly includes spaced vertical cylindrical canisters, and suitable piping between them to permit directing of flow of contaminated oil through one and the other alternately, so that one can be used while the other is being resupplied with filter elements, inspected, cleaned or whatever. The filter elements consists of long cylinders of filtration material which can be paper or cloth. They are commonly over three feet tall, and a canister, from its base to the handle of a screw type hoisting mechanism for the top closure of the canister, which is in common use, can be almost seven feet tall.

In the past, it has been common practice to let the contaminated oil from the used filters which are removed from the canister to drain onto the ground or into the sewer line, and to throw the used filters into the trash. This is no longer tolerable. In addition, the changing of the filters has been an awkward and inconvenient job.

One of the objects of this invention is to provide a modular assembly that will provide for the easy and almost automatic draining and collection of the waste oil that drains from the filter elements and from the cover of the canisters, and which provides a convenient place to store (a) the used elements while they drain, and (b) fresh filter elements in preparation for their installation in a canister from which used filter elements have been taken.

Another object of this invention is to provide such an assembly by which waste oil is readily recovered for reuse, and to provide an assembly by which waste oily water can be recovered and subsequently separated for reuse.

Still another object of this invention is to provide a structure by which the task of changing filters is made easier than it has been heretofore.

Other objects of this invention will be apparent to those skilled in the art in light of the following description and accompanying drawings.

SUMMARY OF THE INVENTION

In accordance with this invention, generally stated, a modular filter drain assembly is provided for a duplex filter having two vertically oriented cylindrical filter canisters each containing a plurality of replaceable filter elements, the filter canisters having selectively removable top closures, the canisters being spaced apart and connected by valve to piping between them. A vertical plane including and extending between the vertical axes of the canisters defines a plane of reference. The drain assembly includes a sump or base pan with side walls embracing the lower portion of the assembly and the filter canisters, a stand outboard of each of the filter canisters extending substantially perpendicularly to the plane of reference and projecting beyond the canisters in each direction, each of the stands comprising vertical legs at corners thereof, a top drain pan near an upper end of the legs and supported thereby, a filter element support pan intermediate the drain pan and the sump pan, and a platform between the stands with an edge generally parallel to the plane of reference and adjacent the filter canisters. The top drain pan has filter element receiving passages near the platform. The filter element support pan has a surface below the filter element receiving passages for engaging a lower edge of the filter elements and drain means permitting liquid from used filter elements to drain to the sump pan, the filter element support pan surface being spaced below the top pan a distance sufficiently less than the height of the filter elements to cause the elements to project above the top drain pan enough to permit the filter elements easily to be removed manually from the filter element passages.

Preferably the assembly includes means for swinging each of the filter canister top closures from a position at which it closes the filter canister to a position over a portion of one of the top drain pans remote from the filter element passages, so that liquid dripping from the closure will be caught by the pan and directed to the sump. At the same time, the closure will be clear of the filter element passages, so that filter elements can be slipped into the passages or removed therefrom without interference. In the preferred embodiment, the filter element passages of the top pan are defined by open-ended sleeves of sufficient length to provide lateral support and guidance for the filter elements, although they are of sufficiently larger diameter than the filter elements to permit the easy insertion and removal of the elements, and the effective draining of used elements therein.

DESCRIPTION OF THE PREFERRED EMBODIMENT

Figure 1:
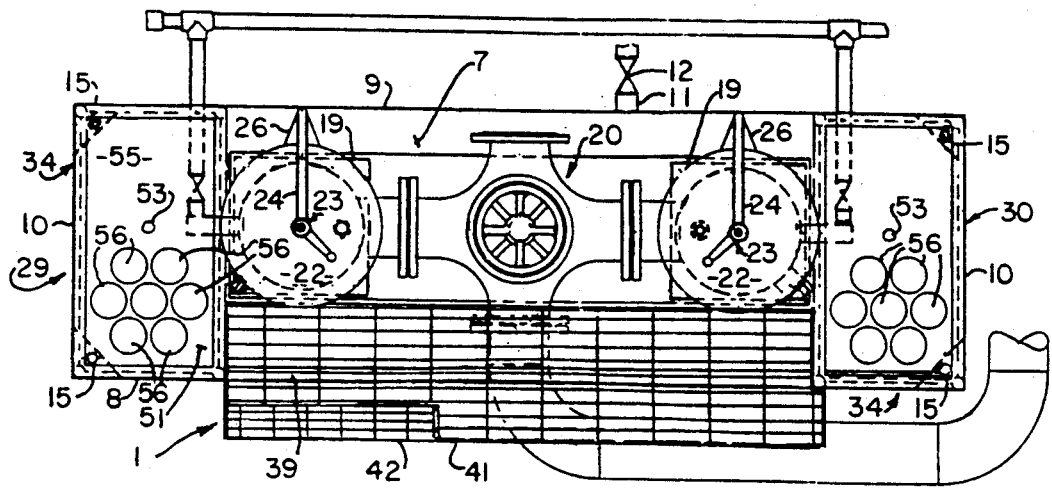
FIG. 1 is a top plan view of one embodiment of modular filter drain assembly of this invention.

Referring now to the drawing for one illustrative embodiment of the modular filter drain assembly of this invention, reference numeral 1 indicates the completed assembly. In this illustrative embodiment, the assembly is shown as mounted on a base pad 4 on a concrete floor 3. However, the assembly can also be mounted on a suitable base or frame in an elevated structure, the base itself forming no part of this invention.

A sump pan 6, which forms a part of the module of this invention, has a bottom 7, a front wall 8, a rear wall 9 and end walls 10. A drain fitting 11 in the rear wall 9 has a valve 12 in it. The fitting 11 communicates with the interior of the sump pan immediately adjacent the bottom of the sump pan. At each of the four corners of the pan, the meeting walls are recessed, and enclosed along their tops by a heavy corner plate 13, through which studs 14, anchored in the concrete floor 3, extend, to receive nuts 15, by which the sump pan is bolted to the base and floor. The space between the floor and the corner plates is filled with grout, of any various types, cement based or epoxy based, for example.

The sump pan 6 totally surrounds the bases of filter canisters 16 and 18, which can be mirror images of one another. Each of the canisters is supported on a base 19, which, in the embodiment shown, consists of an inverted, open bottomed pan that embraces a similar box like structure welded liquid tight to the upper surface of the bottom of the sump pan. Both the sump pan box and the canister base have a central opening, through which the cement or epoxy is poured and compacted to form base 4. The height of the box, like the height of the corner plates, is sufficient to insure that the level of waste oil and water in the sump pan does not reach the top of either one.

The filter canisters 16 and 18 are connected by the usual piping and valving 20, common to duplex filters, and do not form a part of this invention.

Each of the filter canisters has a top closure 22, shown somewhat schematically. The top closure 2 is bolted to the top of the canister in practice. Each closure 22 is lifted and lowered by a manually operated screw hoist 23 supported by an arm 24 hingedly mounted on a vertical support 25 carried by a bracket 26 welded to the canister. These elements of the hoist ar shown somewhat schematically. In practice, they can take the form of a heavy, one-piece davit, a vertical part of which can be swingably mounted in a sleeve carried by the bracket 26. In any event, the cover, when lifted, can be swung outboardly of the canisters.

Being cylindrical, the filter canisters 16 and 18 have vertical center lines, and a plane extending between them defines a plane of reference with respect to the elements of the assembly.

In the illustrative embodiment shown, each of the canisters contains seven filter elements 27. The filter elements are hollow, open ended cylinders of a suitable filtration material, frequently paper.

Stands 29 and 30 are positioned outboard of the canisters 16 and 18 respectively, close to and tangent to the canisters, generally perpendicularly to the plane of reference. Each of the stands has outboard legs 31 within and adjacent the corners of the sump pan, and supported by the corner plates 13. Inboard legs 32 are parallel to and aligned with the outboard legs 31. A top rail 34 is secured to the upper ends of the legs 31 and 32, and runs completely around them, forming a rectangular railing. A platform support pipe 39 is welded at each end to a front inboard leg 32 at a height from the base at which a platform 41 is to be. The platform 41 is, in this embodiment, a grating that rests on the support 39, and may be secured to it. It is secured along its front edge to a plate 40 which extends between uprights 45 of a guard rail 46 that extends from the inboard edge of the stand 30 to the edge of steps 42. The uprights 45 are connected by a top rail member 48 and an intermediate rail member 49. The outer upright 45 is connected to the rail 34 of the stand 30 by a short rail 47. The steps 42 are, in this embodiment, made up of stringer plates 43, each with an inturned foot secured to the floor 3, and an upper end secured to the platform 41, and treads 44 secured to the inboard sides of the stringer plates 43.

In each of the stands, a top drain pan 50 is secured to the four vertical legs of the stand, spaced below the top rail 34 to be at a convenient height for an operator. In this embodiment, the top drain pan 50 is parallel with the floor. The top drain pan 50 has a bottom 51 and side walls 52. The side walls 52 are coved at their meeting corners, to accommodate the legs 31 and 32, and are welded or otherwise secured thereto in a sealed manner. Each of the top drain pans has a drain hole 53 in its center, from which a drain pipe 54 communicates. To the rear of the drain hole 53, the bottom 51 is continuous, to form a closure drip area 55. Forward of the drain hole 53, the top drain pan is provided, in this embodiment, with a cluster of seven filter element passages 56, each of which communicates with a depending sleeve 57.

A lower drain and filter element support pan 60 is, like the top drain pan 50, supported at its corners by the legs 31 and 32. The pan 60 has a bottom 61 and side walls 62 which, like the bottom and side walls of the top pan, are coved to receive the legs to which they are attached. In this embodiment, the pan 60 is also parallel with the floor, and has at or near its center a drain hole communicating with a drain pipe 63. In this embodiment, the bottom 61 is continuous but for the drain hole. However, to facilitate draining of the filter elements, the bottom can be ribbed or pitched toward the drain pipe 63, or otherwise configured to aid the draining.

A modular assembly of this invention can be preassembled, or can be assembled at the site. In either event, the assembly is compact and simple, but effective.

In use, because of the provision of the platform 41, an operator is in a position easily to reach a handle 28 of the hoist mechanism 23, and to swing the cover to the area 55 of the top drain pan 50. The operator can then remove the filter elements, and slide them into the passages 56, the sleeve 57 being of sufficient internal diameter to permit the filter elements easily to be inserted and slide through, but sufficiently close to provide guidance and support for the cylindrical filter elements. Oil that drips from the closure 22, and which drains from the filter elements 27 is caught either by the top drain pan 50 or the lower drain pan 60, and flows through the drain pipes 54 and 63 to the sump pan 6, from which it is pumped to a separator, or back to the filter that is in operation. When the used filter elements have been thoroughly drained, they can be removed for disposal. Fresh elements can then be placed in the filter element passages 56 which serve as a convenient rack for fresh elements to be installed to prepare one of the filter canisters for reuse.

Figure 2:
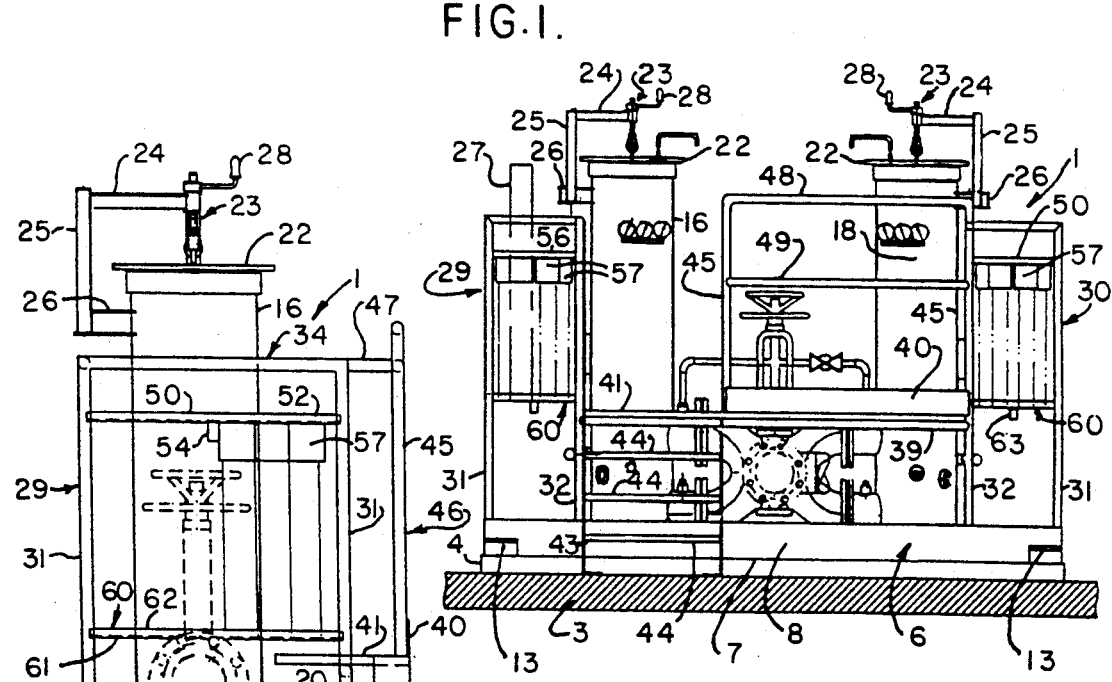
FIG. 2 is a view in front elevation of the assembly of FIG. 1.
Figure 3:
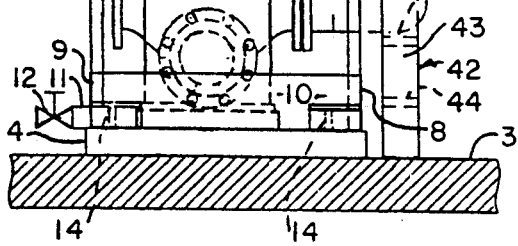
FIG. 3 is a view in side elevation viewed from left to right of FIGS. 1 and 2.

Numerous variations in the construction of the modular assembly of this invention, will become apparent to those skilled in the art in light of the foregoing disclosure. Merely by way of example, the bottom of the top drain pan 50 can be made to slope from the corner toward the drain 53, as can the bottom 61 of the drain pan 60. The drain pipes 54 and 63 can be made of any suitable length, to minimize splashing or the exposure of the stream of oil and water. The number of filter elements passages can be made more or less, depending upon the capacity of the filter canisters. The spacing between the top drain pan 50 and the lower pan 60 can be varied to accommodate filter elements of different heights, or to provide more or less projection of the filter element from above the top pan 50. The construction of the steps can be different from the ladder-like arrangement shown in FIG. 2, as by using a sloping stringer, although such an arrangement requires a greater space, and poses some danger of tripping passersby. These are merely illustrative.

Having thus described the invention, what is claimed and desired to be secured by Letters Patent is:

1. A modular filter drain assembly for a duplex filter having two vertically oriented cylindrical filter canisters each containing a plurality of replaceable cylindrical filter elements, said filter canisters having selectively removable top closures swingable to a top pan area, said filter canisters being spaced apart and connected by valved piping between them, a vertical plane between vertical axes of said canisters defining a plane of reference, said drain assembly comprising a sump base pan with side walls embracing the lower portion of said assembly and said filter canisters, a stand outboard of each of said filter canisters, extending substantially perpendicularly to the plane of reference and projecting beyond the said canisters in each direction, each of said stands comprising vertical legs at corners thereof, a top drain pan near an upper end of said legs and supported thereby, a filter element support pan intermediate said top drain pan and said sump pan, and a platform extending between said stands with an edge generally parallel to said plane of reference and adjacent said filter canisters; said top drain pan having filter element receiving passages near said platform and a drain passage; said filter element support pan having a surface below said filter element receiving passages for engaging a lower edge of said filter elements, and drain means, said filter element support pan surface being imperforate but for said drain means for permitting liquid from used filter elements to drain to said sump pan, said filter element support pan surface being spaced below said top pan a distance sufficiently less than the height of said filter elements to cause said elements to project above said top drain pan enough to permit the filter elements easily to be removed manually from said filter element passages.

2. The assembly of claim 1 including means for swinging each of said filter canister top closures from a position at which it closes said filter canisters to a position over a portion of one of said top drain pans remote from said filter element passages, whereby liquid dripping from said closure will be directed to said sump.

3. The assembly of claim 1 wherein said filter element passages of said top pan are defined by open-ended sleeves of sufficient length to provide lateral support and guidance for filter elements slid therein.

4. The assembly of claim 2 wherein said top drain pan is imperforate save for said filter element passages and a single generally centrally located drain passage.

5. The assembly of claim 1 wherein said filter element support pan is imperforate save for said drain means, and said drain means comprises a single passage.

6. The assembly of claim 1 wherein the sump pan is sheet steel, with a bottom and upwardly extending front, rear and end side walls, said front and rear side walls being long relative to said end walls, any of said walls having a drain hole adjacent said bottom to receive a fitting, said bottom being connected to said filter canisters and when so connected being liquid impervious throughout its extent, said side walls and said bottom being in liquid impervious relation to one another and said side walls having at each juncture a corner plate sealed to said side walls above the level of the bottom and sealed to an intervening wall extending diagonally between said side walls at said juncture to provide an elevated mounting area through which a mounting stud anchored in said base or floor projects.

* * * * *